United States Patent [19]
Auger

[11] Patent Number: 5,573,857
[45] Date of Patent: Nov. 12, 1996

[54] LAMINATED SHIELDING TAPE

[75] Inventor: Thomas J. Auger, Putnam, Conn.

[73] Assignee: NEPTCO Incorporated, Pawtucket, R.I.

[21] Appl. No.: 537,127

[22] Filed: Sep. 29, 1995

[51] Int. Cl.⁶ .................. H05K 9/00; B32B 27/36
[52] U.S. Cl. .............. 428/480; 428/458; 174/35 R; 174/35 MS
[58] Field of Search .................. 428/138, 344, 428/458, 480; 174/35 R, 35 MS

[56] References Cited

U.S. PATENT DOCUMENTS

| | | | |
|---|---|---|---|
| 4,582,729 | 4/1986 | Tsiamis et al. | 427/304 |
| 4,684,762 | 8/1987 | Gladfelter | 428/229 X |
| 4,749,625 | 6/1988 | Obayashi et al. | 174/35 MS X |
| 4,965,408 | 10/1990 | Chapman et al. | 174/35 MS |
| 4,980,564 | 12/1990 | Steelmon | 174/35 MS |
| 5,089,326 | 2/1992 | Bonazza | 428/284 |
| 5,115,140 | 5/1992 | Rodriguez | 174/35 MS |
| 5,155,316 | 10/1992 | Chiu | 174/35 MS X |
| 5,250,342 | 10/1993 | Lang et al. | 428/42 X |
| 5,286,318 | 2/1994 | Sims et al. | 174/35 MS X |

*Primary Examiner*—Daniel Zirker
*Attorney, Agent, or Firm*—Salter & Michaelson

[57] ABSTRACT

A shielding tape for use with communication wiring susceptible to cross talk and electromagnetic interference includes a protective component having a metallic layer for shielding and protecting the communication wiring from cross talk and electromagnetic interference, and a structural component having a layer of reinforcing material disposed between two layers of polyethylene terephthalate ("PET").

11 Claims, 2 Drawing Sheets

LAMINATED SHIELDING TAPE

BACKGROUND AND SUMMARY OF THE INVENTION

This invention relates generally to protective tape, and more particularly to a laminated shielding tape capable of preventing cross talk interference and other related electromagnetic interference in wiring systems.

The present invention represents an improvement in tape used as a shield against electromagnetic interference (EMI) and radio frequency interference (RFI) in wiring systems for aircraft and the like. Such tape is used in wiring systems having a plurality of wires or cables which transmit information. One problem associated with typical wiring systems is that cross talk and electromagnetic interference occurs between adjacent wires or groups of wires operating at similar frequencies. In order to prevent cross talk and electromagnetic interference, tape is disposed around or between the wires for shielding and supporting them.

One tape composition known in the art comprises a layer of one ounce copper foil sandwiched between two layers of 0.00092 inch polyethylene terephthalate ("PET"). One ounce copper foil is defined in the art as a copper foil having a weight of one ounce per square foot of material. In use, the prior art tape is usually stripped at its ends i.e. the PET layers removed to expose the copper layer for soldering to a ground wire, or termination. When the copper layer is to be soldered, the stripped copper end is dipped in tin to provide an appropriate soldering surface. The tin coated copper layer is then soldered to a grounding wire. One problem discovered with this composition is that the tape has a tendency to crack and fail at the location of the juncture of the copper and partially stripped PET layers. More specifically, the copper tears, ruptures or cracks at the exposure site. There is presently a need for a shielding tape capable of protecting wires subjected to cross talk and electromagnetic interference while maintaining its structural integrity.

In general, the present invention is directed to a shielding tape for use with communication wiring susceptible to cross talk and electromagnetic interference. The shielding tape comprises a protective component having a metallic layer for shielding and protecting the communication wiring from cross talk and electromagnetic interference, and a structural component having a layer of fiberglass disposed between two layers of polyethylene terephthalate ("PET").

Accordingly, among the several objects of the present invention are the provision of a shielding tape which is capable of preventing cross talk and electromagnetic interference between wires of a wiring system; the provision of such a shielding tape which is durable in construction and is resistent to failure after a period of use; the provision of such a shielding tape which is reliable and requires less maintenance than prior art tape; the provision of such a shielding tape which is capable of being utilized in a variety of different fashions; and the provision of such a shielding tape which is easy and cost-efficient to use.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE PREFERRED EMBODIMENT

Figure 1:
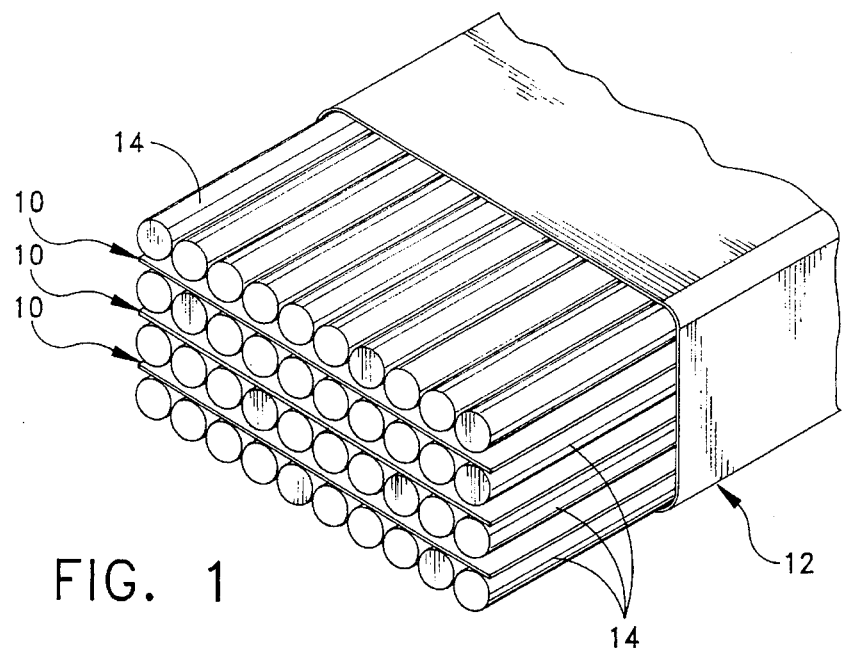
FIG. 1 is a partial perspective view of a ribbonized organized integrated wiring system comprising a plurality of layers of wires separated by shielding tape of the present invention.
Figure 2:
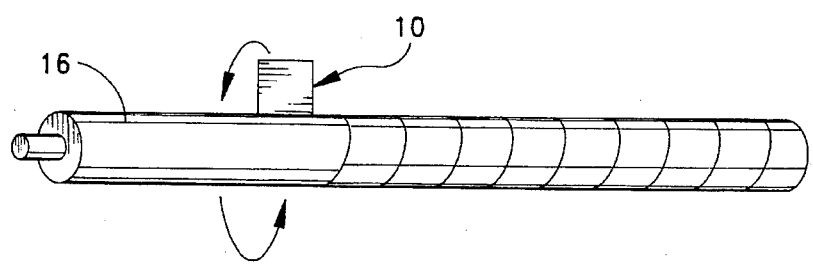
FIG. 2 is a perspective view of a wire being wrapped with shielding tape.
Figure 3:
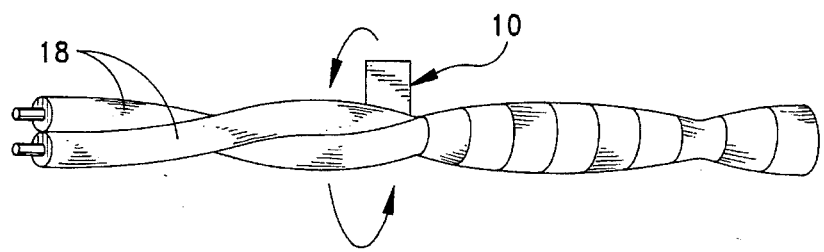
FIG. 3 is a perspective view of two twisted wires being wrapped with shielding tape.
Figure 4:
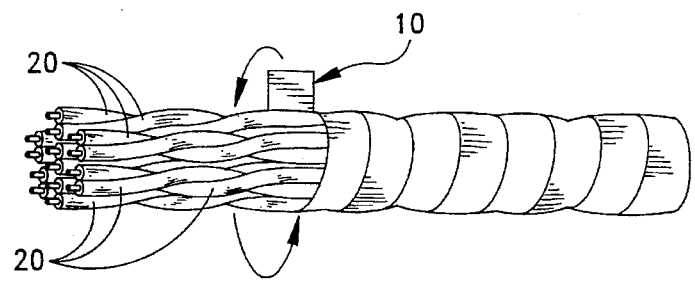
FIG. 4 is a perspective view of a plurality of twisted wires being wrapped with shielding tape.

Referring to the drawings, and to FIGS. 1–4 in particular, there is generally indicated at 10 shielding tape of the present invention being used in several different applications. FIG. 1 illustrates the shielding tape being used in an application known as a ribbonized organized integrated wiring system, generally indicated at 12, comprising a plurality of layers of wires 14 each separated by shielding tape 10. In such a system, the layers of wires 14 are each separated by the shielding tape 10 of the present invention, the shielding tape 10 substantially preventing cross talk and other related electromagnetic interference between the layers of wires 14. The shielding tape 10 also provides a physical barrier between adjacent layers of wires 14 and is subject to forces caused by the movement of the wires of the layers. FIGS. 2–4 illustrate the shielding tape 10 being wrapped around a single wire 16, two twisted wires 18 and a plurality of twisted wires 20, respectively.

It is known that cross talk within a system is caused by physical separation and signal characteristics, and can be accounted for by signal organization when all of the signal properties are known. Unintended signals, such as conducted emissions and switching transients and their harmonics, can adversely effect the operation of the system. The shielding tape 10 of the present invention assists in substantially eliminating cross talk and electromagnetic interference while maintaining its structural integrity and reliability. More specifically, the tape is especially resistant to tearing, rupturing and cracking.

Figure 5:
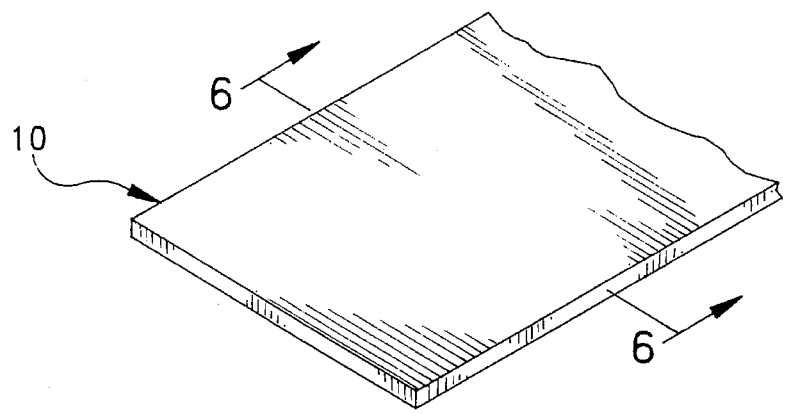
FIG. 5 is a partial perspective view of the shielding tape.
Figure 6:
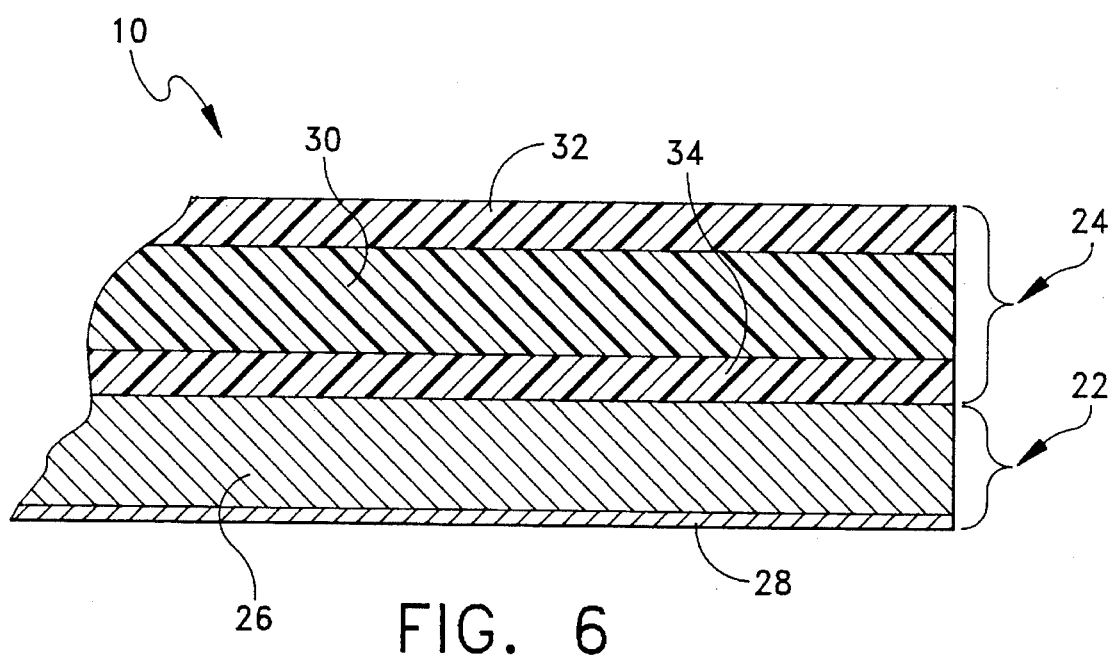
FIG. 6 is a partial, enlarged cross-sectional view taken along line 6—6 of FIG. 5 illustrating the component layering of the shielding tape.

Referring to FIGS. 5 and 6, and more particularly to FIG. 6, the shielding tape 10 comprises a protective component generally indicated at 22 for protecting the wire or wires which it surrounds from cross talk and electromagnetic interference. The shielding tape 10 also comprises a structural component generally indicated at 24 which gives the shielding tape 10 structural rigidity and durability. The protective component 22 includes a metallic layer 26 for shielding and protecting the communication wiring. Preferably, the metallic layer 26 comprises a layer of copper foil. More preferably, the metallic layer 26 comprises a one ounce copper foil which foil has been found to be particularly effective in substantially eliminating cross talk, although in practice, the copper layer can range from ¼ ounce to 2 ounce copper depending upon the particular application. For example, during an application where the strength of the signal produced by the wire(s) is strong, the thickness of layer 26 of the tape 10 should be increased.

Referring to FIG. 6 the copper foil is preferably coated with a metallic plating for receiving a solder bond. Preferably the copper foil is coated with a 2.0 micron layer 28 of tin plating. The tin plating layer 28 facilitates soldering of the tape 10 to wires.

The structural component 24 of the shielding tape 10 includes a layer of reinforcing material 30 between two protective layers of polyethylene terephthalate ("PET") 32, 34. More particularly, the PET layers 32, 34 of the structural component 24 are each 0.00048 inch thick and the reinforcing material layer 30 comprises type 106 fiberglass fabric per ASTM 3824. Alternative tear resistant materials such as non-woven fiberglass paper, and other suitable tear resistant materials may be used as well as woven fiberglass. Moreover, polyamide, polypropylene, and nylon may be substituted for the PET layers. These materials must have a sufficient heat resistance so as to withstand soldering temperatures. The purpose of the PET film layers 32, 34 is that the inner layer 34 provides a good bonding surface for bonding with the metallic layer 26, and the outer layer 32 provides a smooth outer surface which does not damage the wires as would the rough fiberglass layer.

The metallic layer 26 of the protective component 22 and the layers 30, 32 and 34 of the structural component 24 are each bonded together by suitable adhesive. First, the layer of reinforcing material 30 is laminated with one of the PET layers (e.g., layer 32) on one of its surfaces. Next, the other PET layer (e.g., layer 34) is laminated to the other surface of the reinforcing material layer 30. After completing this step, the tin coated one ounce copper layer 26 is laminated to the structural component 24. In one embodiment of the shielding tape 10, once all the layers are laminated together, has an overall thickness of 0.0037 inch +/−0.0003. The tape can be sold in roll form, for example.

Preferably, the reinforcement material layer 30 is saturated with synthetic resin material. This step increases the tape's resistance to absorbing moisture, e.g., water and/or petroleum-based products, present in the area surrounding the tape. Such synthetic resin materials can be chosen from a group consisting of epoxies, polyurethanes, acrylics and silicones. The reinforcement material layer 30 must be saturated to the point where the layer is incapable of soaking fluids.

It should be noted that the shielding tape 10 of the present invention is significantly stronger than prior art tapes used in a similar manner. It should also be noted that since the tin coated copper layer 26 is always exposed, it can readily be soldered to as required without compromising the structural integrity of the shielding tape 10. Prior tape required that the structural layers be stripped away or peeled back to expose the metallic layer. The shielding tape 10 of the present invention is at all times ready for soldering. It should further be noted that the shielding tape 10 is particularly resistent to tearing and to cracking failure. This is due to the reinforcing material layer 30 used in the structural component 24 of the shielding tape 10 which is lacking in prior art tapes.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A shielding tape for use with communication wiring susceptible to cross talk and electromagnetic interference, said shielding tape comprising a protective component having a metallic layer for shielding and protecting the communication wiring from cross talk and electromagnetic interference, and a structural component having a layer of tear resistant reinforcing material disposed between two protective layers, said protective component and structural component being laminated together to form a sheet.

2. A shielding tape as set forth in claim 1, said metallic layer comprising copper foil.

3. A shielding tape as set forth in claim 2, said protective layer comprising polyethylene terephthalate ("PET").

4. A shielding tape as set forth in claim 1, said metallic layer comprising copper foil coated with a metallic plating effective for receiving a solder bond, said copper foil being laminated such that the plating is an exposed external layer.

5. A shielding tape as set forth in claim 1, said metallic plating comprising tin.

6. A shielding tape as set forth in claim 1, said protective component and said layers of the structural component each being bonded together by adhesive.

7. A shielding tape as set forth in claim 1, said reinforcement material layer comprising fiberglass.

8. A shielding tape as set forth in claim 7, said fiberglass layer of the structural component comprising a woven fiberglass fabric.

9. A shielding tape as set forth in claim 2, wherein said reinforcement material layer comprises fiberglass.

10. A shielding tape as set forth in claim 3, wherein said reinforcement material layer comprises fiberglass.

11. A shielding tape as set forth in claim 4, wherein said reinforcement material layer comprises fiberglass.

\* \* \* \* \*